(12) United States Patent
Furusawa (10) Patent No.: US 6,188,665 B1
(45) Date of Patent: Feb. 13, 2001

(54) COMPACT OPTICAL DISK DEVICE CAPABLE OF DRIVING VARIOUS TYPES OF OPTICAL DISKS

(75) Inventor: Koji Furusawa, Tokyo (JP)

(73) Assignee: NEC Corporation, Tokyo (JP)

( * ) Notice: Under 35 U.S.C. 154(b), the term of this patent shall be extended for 0 days.

(21) Appl. No.: 09/113,519

(22) Filed: Jul. 10, 1998

(30) Foreign Application Priority Data

Jul. 10, 1997 (JP) .................................................... 9-185215

(51) Int. Cl.[7] .................................................. G11B 17/30
(52) U.S. Cl. .............................................................. 369/219
(58) Field of Search ............................. 369/219, 36, 222, 369/77.1, 77.2

(56) References Cited

U.S. PATENT DOCUMENTS

| 5,600,623 | * | 2/1997 | Miyazaki et al. | 369/219 |
| 5,719,848 | * | 2/1998 | Ikegame | 369/219 |
| 5,748,605 | * | 5/1998 | Lee | 369/222 |
| 5,848,049 | * | 12/1998 | Yokota et al. | 369/219 |

FOREIGN PATENT DOCUMENTS 8-297909   11/1996   (JP) .

* cited by examiner

Primary Examiner—David Davis
Assistant Examiner—Tod Kupstas
(74) Attorney, Agent, or Firm—McGinn & Gibb, P.C.

(57) ABSTRACT

An optical disk device applicable to a plurality of optical disks differently normalized from each other, including rotation driving unit which support the optical disk and which drive rotation of the optical disk; a plurality of optical heads which are applicable to the a plurality of differently normalized optical disks, respectively; single guiding member for guiding each of the a plurality of optical heads in a radial direction of the optical disk supported by the rotation driving unit; pushing member for pushing the each of the a plurality of optical heads along the single guiding member; container unit for containing all of the a plurality of optical heads; and optical head moving member for moving one of the a plurality of optical heads from the container unit toward the single guiding member or from the single guiding member toward the container unit.

19 Claims, 7 Drawing Sheets

COMPACT OPTICAL DISK DEVICE CAPABLE OF DRIVING VARIOUS TYPES OF OPTICAL DISKS

BACKGROUND OF THE INVENTION

This invention relates to an optical disk device for use in driving an optical disk, such as compact disk (CD), digital versatile disk (DVD), or the like.

In order to make a highly integrated optical disk, a laser beam spot is made small in size by shortening a wavelength of the laser beam and making (NA) of an objective lens large. For example, high integration is thereby achieved in a recently normalized DVD based on a normalization of CD which is widely used nowadays. Such a DVD and a CD have the same diameters and thickness of the disks therebetween. It is possible that a driving unit for rotating the disks and a loading unit for containing the disks are commonly used between the DVD and the CD. From the perspectives of a manufacturing cost and a mounting space, it is desirable that an optical disk device be applied not only to the DVD but also to the CD. Moreover, it is further desirable that an optical disk device can be commonly applied to different disks which are similar to each other in disk diameters, wavelength of lazer beams, and writing systems thereof. For this purpose, various techniques are proposed conventionally. Within the techniques, the highest compatibility is provided by such an optical disk device having a plurality of optical heads applicable to differently normalized optical disks, respectively.

An example of such a conventional optical disk device having a plurality of optical heads is disclosed in Unexamined Japanese Patent Publication 297909/1996. The conventional optical disk device disclosed in the above-referenced paper comprises a rotating and driving unit for supporting and driving an optical disk, a plurality of optical heads applicable to differently normalized optical disks, respectively to write and read the optical disks, guiding members equal to the optical heads in number for guiding each optical head along different radial directions of the optical disks, and a pushing member for pushing a guiding operation by each guiding member. In the optical disk device, the pushing member moves to a predetermined position so as to bring each optical head to a desired position.

However, the conventional optical disk device inevitably becomes large in size, since the guiding members therein are required to be equal in number to the optical heads.

SUMMARY OF THE INVENTION

It is therefore an object of the present invention to provide an optical disk device which is compact in size and which has a single guiding member commonly applicable to a plurality of optical heads.

Other objects of the present invention will become clear as the description proceeds.

According to an aspect of this invention, there is provided an optical disk device which is for use in recording and reproducing an optical disk and which is capable of being applied to a plurality of optical disks differently normalized from each other, including: rotation driving means which support the optical disk and which drive rotation of the optical disk, a plurality of optical heads which are applicable to the a plurality of differently normalized optical disks, respectively, single guiding means for guiding each of the a plurality of optical heads in a radial direction of the optical disk supported by the rotation driving means, pushing means for pushing the each of the a plurality of optical heads along the single guiding means, container means for containing all of the a plurality of optical heads, and optical head moving means for moving one of the a plurality of optical heads from the container means toward the single guiding means or from the single guiding means toward the container means.

The container means may include a plurality of containers for the a plurality of optical heads, respectively, the optical head moving means including a connecting portion for selectively connecting the container with the single guiding means, and a pushing portion for pushing a move of the one of the a plurality of optical heads between each of the containers and the single guiding means.

The container means may further include a predetermined rotation axis. Each of the containers may be located at a distance equal to each other from the rotation axis, the connecting portion rotates the container around the rotation axis so as to connect the container with the single guiding means.

The single guiding means may include a first straight guide rail located in a radial direction of the optical disk, the a plurality of containers may include a plurality of second straight guide rails each having a length which is at least greater than a width of a moving direction of the optical head, respectively, the a plurality of second straight guide rails being located in parallel to the first straight guide rail, respectively, the connecting portion rotating each of the second straight guide rails around the rotation axis consisting of a part of each of the second straight guide rail in the direction parallel to the first straight guide rail so as to make the each of the second straight guide rails be positioned on the same line as that of the first straight guide rail.

The single guiding means may include first straight guide rail and the a plurality of second straight guide rails comprise rods, respectively having the same cross-sectional shape as each other, both of the rods being fixed at one end, and free ends of the rods being opposite to each other, the connecting portion supporting the second straight guide rails on the same surface simultaneously, the connecting portion being rotatable around the rotation axis, a first distance from the rotation axis to the first straight guide rail and a second distance from the rotation axis to the each second straight guide rail being equal to each other, a third distance from the surface to the free end of the first straight guide rail being substantially equal to a length of the each second straight guide rail.

The single guiding means may include a first straight guide rail located in a radial direction of the optical disk, the a plurality of containers include a plurality of second straight guide rails each having a length which is at least greater than a width of a moving direction of the optical head, respectively, the a plurality of second straight guide rails being located radially around a direction perpendicular to an elongated line of the first straight guide rail, the connecting portion rotating each of the second straight guide rails around the rotation axis consisting of the radially formed central portion so as to make the each of the second straight guide rails be positioned on the same line as that of the first straight guide rail.

The single guiding means may include first straight guide rail and the a plurality of second straight guide rails may comprise rods, respectively having the same cross-sectional shape as each other, both of the rods being fixed by their one ends, the connecting portion supporting the second straight guide rails on the same surface including the first straight guide rail simultaneously, the connecting portion being rotatable around the rotation axis, a primary distance from the rotation axis to a free end of the first straight guide rail and a secondary distance from the rotation axis to a free end of the each second straight guide rail being equal to each other.

DETAILED DESCRIPTION OF THE PREFERRED EMBODIMENTS

Referring now to FIGS. 1 and 2A through 2D, description will proceed to an optical disk device according to a first embodiment of the present invention.

Figure 1:
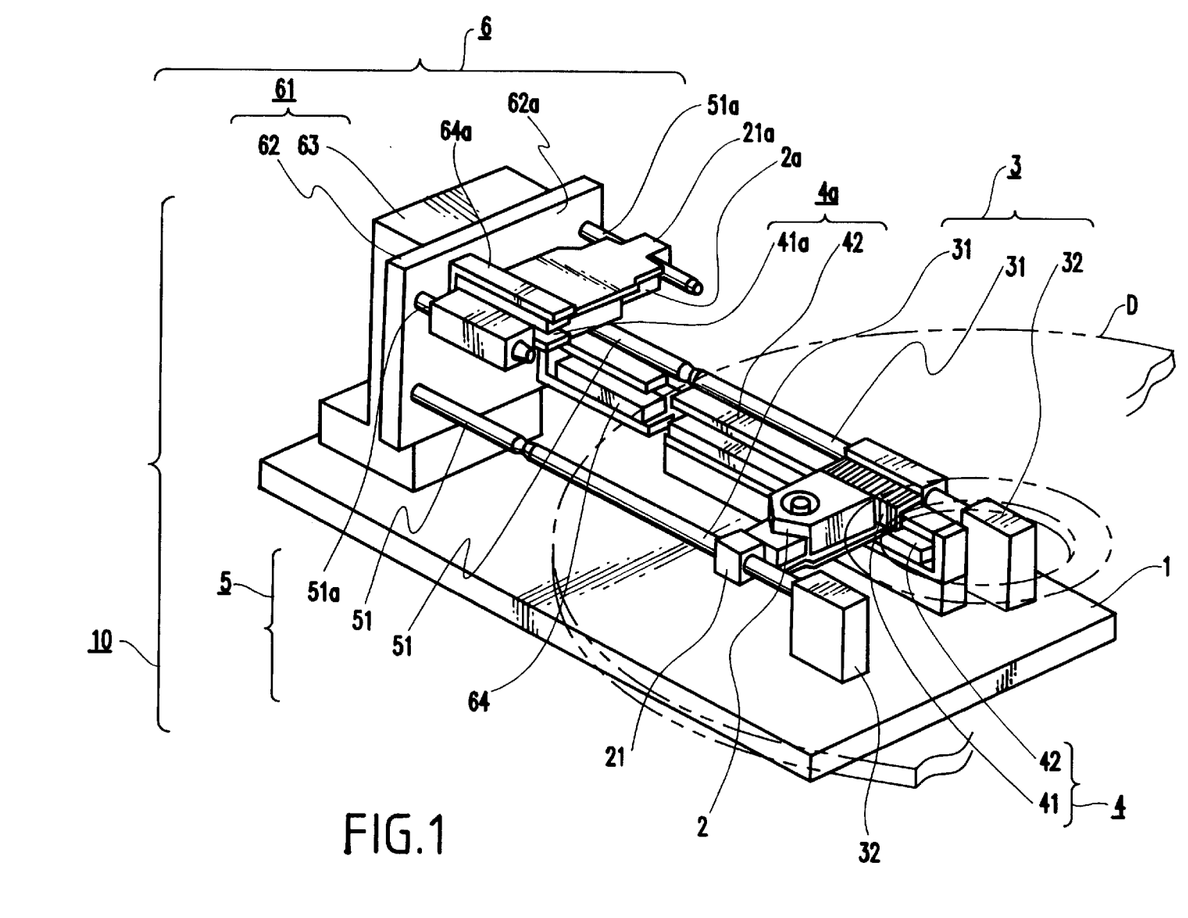
FIG. 1 is a schematic perspective view of an optical disk device according to a first embodiment of the present invention.
Figures 2A, 2B:
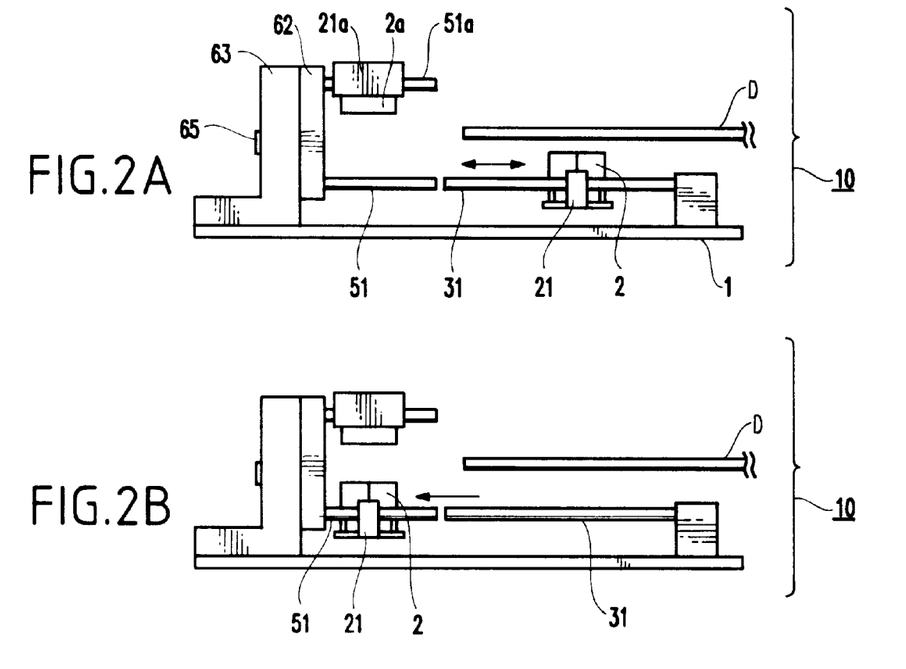
FIGS. 2A through 2D are partial side views of the optical disk device illustrated in FIG. 1, in which an operation thereof proceeds from a step of 2A to that of 2D.
Figure 2C:
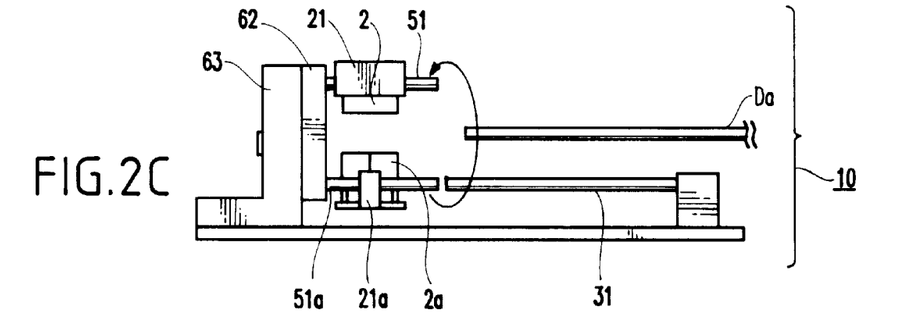
Figure 2D:
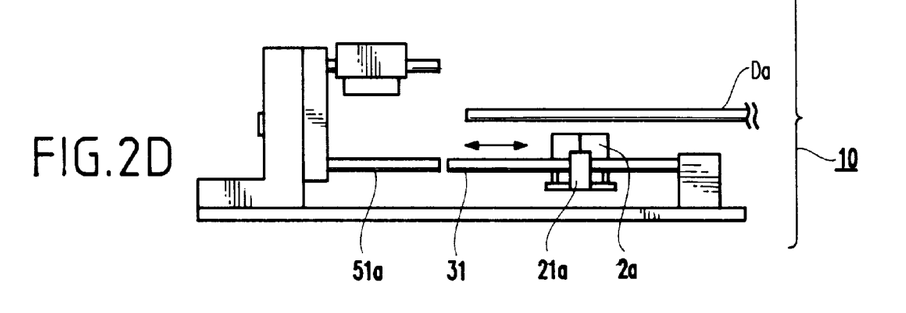

In FIGS. 1 and 2A through 2D, illustrated is an optical disk device 10 which records or reproduces differently normalized two kinds of optical disks D, Da (the optical disk Da is shown in FIGS. 2C and 2D). As illustrated in FIGS. 1 and 2, the optical disk device 10 comprises a base stand 1, an optical disk rotation driving unit (not shown) which supports either the optical disk D or the optical disk Da and drives the rotation thereof, two optical heads 2, 2a which are applicable to the differently normalized two kinds of optical disks D, Da, respectively, single guiding member 3 for guiding each optical head 2 or 2a in a radial direction of an optical disk D or Da supported by the optical disk rotation driving unit, optical head pushing members 4, 4a each for pushing each optical head 2 or 2a along the single guiding member 3, a container unit 5 for containing the two optical heads 2, 2a simultaneously, and optical head moving member 6 for moving one of the two optical heads 2, 2a from the container unit 5 toward the single guiding member 3 or from the single guiding member 3 toward the container unit 5.

In the example being illustrated, a recording surface of the optical disk D becomes parallel to an upper surface of the base stand 1, when the optical disk D is supported by the optical disk rotation driving unit, as depicted by broken lines in FIG. 1. In other words, the recording surface of the optical disk D is directed downward of FIG. 1. The aforesaid single guiding member 3 comprises two rod-shaped guide rails 31 located parallel to the recording surface of the optical disk D and along substantially a radial direction of the optical disk D, and two fixed members 32 each of which is fixed on the upper surface of the base stand 1 to support one end of each rod-shaped guide rail 31 at the side of an inner circumference of the optical disk D, as illustrated in FIG. 1. The two rod-shaped guide rails 31 are located parallel to each other. Each rod-shaped guide rail 31 has a length which ranges from neighborhood of a center of the optical disk D to an outer side of an outer circumference of the optical disk D. Another end of each rod-shaped guide rail 31 at the side of the outer circumference of the optical disk D is not fixed to form a free end. A free end of each rod-shaped guide rail 31 is tapered off, as illustrated in FIG. 1. With the tapered structure of the free end, each of carriages 21, 21a is readily attached to or removed from each rod-shaped guide rail 31.

The optical heads 2, 2a are capable of recording and reproducing the optical disks D, Da, respectively. The optical heads 2, 2a are simultaneously installed on the aforesaid two rod-shaped guide rails 31, respectively. Each of the above-mentioned carriages 21, 21a has a through hole into which each rod-shaped guide rail 31 is inserted. When the optical heads 2, 2a are installed on the two rod-shaped guide rails 81, the optical heads 2, 2a are freely movable along radial directions of the optical disks D, Da by the carriages 21, 21a, respectively.

As illustrated in FIG. 1, coils 41, 41a are installed on the carriages 21, 21a. On the base stand 1, two magnetic members 42 are mounted above and below with a space therebetween to form a magnetic circuit. The magnetic members 42 are located between the two rod-shaped guide rails 31 but near one of the guide rails 31. The magnetic members 42 are extended in parallel to the two rod-shaped guide rails 31 to have a length substantially equal to those of the two rod-shaped guide rails 31. Accordingly, a voice coil motor is formed by a combination of the coils 41, 41a and the magnetic members 42. With the structure, the carriages 21, 21a can be slid along the two rod-shaped guide rails 31 in order that the optical heads 2, 2a may move below the optical disk D or Da between the inner and the outer circumuferences and along the recording surface thereof. The above-mentioned optical head pushing members 4, 4a are composed of the coils 41, 41a and the magnetic circuit formed by the magnetic members 42.

On the other hand, as shown in FIG. 1, a container unit 5 and an optical head moving member 6 are mounted on the base stand 1 in the extended direction of each rod-shaped guide rail 31. The container unit 5 comprises small guide rails 51, 51a which are operable as container sections for containing the optical heads 2, 2a, respectively. Besides, FIG. 1 shows that the optical head 2 is removed from the small guide rail 51 toward the rod-shaped guide rail 31. The optical head moving member 6 comprises a connecting portion 61 for selectively connecting each of the small guide rails 51, 51a with the rod-shaped guide rails 31, and a pushing portion for pushing a move of one of the optical heads 2, 2a between each of the small guide rails 51, 51a and the rod-shaped guide rails 31.

As illustrated in FIG. 1, the aforesaid connecting portion 61 comprises a supporting plate 62 and a rotation driving portion 63. The supporting plate 62 has a flat surface 62a perpendicularly opposite to the above-mentioned free end of each rod-shaped guide rail 31. The rotation driving portion 63 has a rotation axis 65 illustrated in FIG. 2A and a driving motor (not shown). The supporting plate 62 is rotatably supported around the rotation axis 65. Rotation of the supporting plate 62 is driven by the driving motor. Further, the small guide rails 51 and 51a are installed on the flat surface 62a to have two guide rails, respectively. The respective two guide rails are parallel to each other to have a space therebetween. The space between the respective two guide rails is as large as that between the two rod-shaped guide rails 31.

The small guide rails 51, 51a have rod shapes, respectively each of which has the same cross-sectional shape and diameter as the rod-shaped guide rails 31. Each small guide rail 51 or 51a is fixed and supported on the flat surface 62a by only one end thereof. Another end, that is, a free end of each small guide rail 51 is tapered off, as illustrated in FIG. 1. The aforesaid carriages 21, 21a are readily attached to and removed from the small guide rails 51, 51a through the free ends, respectively. Further, the small guide rail 51 has a minimum length to support the carriage 21 while the small guide rail Sla has a minimum length to support the carriage 21a. Namely, as will be understood from FIG. 1, the small guide rail 51 has a length substantially equal to or a little larger than that of the carriage 21 in the moving direction thereof while the small guide rail 51a has a length substantially equal to or a little larger than that of the carriage 21a in the moving direction thereof.

As illustrated in FIG. 1, the supporting plate 62 is rotatably supported by the rotation driving portion 63 through the rotation axis 65 extending parallel to the rod-shaped guide rails 31. In addition, the small guide rails 51, 51a are symmetrically installed on the supporting plate 62 with the rotation axis 65 interposed therebetween to have a distance equal to each other from the rotation axis 65. Furthermore, a first distance from the rotation axis 65 to each rod-shaped guide rail 31 and a second distance from the rotation axis 65 to each small guide rail 51 or 51a are determined equal to each other.

A distance from the flat surface 62a to the free end of each rod-shaped guide rail 31 is substantially equal in length to or a little longer than a length of each small guide rail 51 or 51a, as will be understood from FIG. 1.

With the structure mentioned above, each small guide rail 51 or 51a and each rod-shaped guide rail 31 can be positioned in the same line to render the mutual free ends adjacent and opposite to each other by rotating the supporting plate 62 up to a suitable position. If the aforesaid distance from the flat surface 62a to the free end of each rod-shaped guide rail S1 is determined to be just equal in length to the length of each small guide rail 51 or 51a, the respective free ends become in contact with each other. In such a state, it becomes possible that the optical head 2 mounted on the carriage 21 moves between the small guide rail 51 and the rod-shaped guide rail 31. Further, when the supporting plate 62 is rotated by an angle of 180 degrees from the state, the small guide rail 51a and each rod-shaped guide rail 31 can also be positioned in the same line. It also becomes possible that the optical head 2a mounted on the carriage 21a moves between the small guide rail 51a and the rod-shaped guide rail 31.

The aforesaid pushing portions are provided independently for pushing the move of either the optical head 2 or 2a. Namely, these pushing portions are composed of voice coil motors which comprise the coils 41, 41a formed on the carriages 21, 21a and the magnetic circuits formed by the magnetic members 64 or 64a installed on the flat surface 62a in parallel to the small guide rails 51, 51a to have a length substantially equal to that of the small guide rails 51, 51a. By each of these pushing portions, each carriage 21, 21a is sent from each of the small guide rails 51, 51a to each of the rod-shaped guide rails 31 and is withdrawn to the side of each of the small guide rails 51, 51a.

Besides, each carriage 21, 21a may be fixed on each of the small guide rails 51, 51a by a certain fixing member. The certain fixing member can prevent each carriage 21, 21a from being dropped through the side of the free end of the small guide rails 51, 51a, when the optical disk device 10 is not used.

Referring to FIGS. 2A through 2D with reference to FIG. 1 continued, description is made as regards an operation of the optical disk device 10.

When the optical disk D is recorded or reproduced, the carriage 21 having the optical head 2 capable of recording or reproducing the optical disk D is set on the rod-shaped guide rails 31, as illustrated in FIG. 2A. The optical head 2 is brought in a radial direction of the optical disk D by the optical head pushing members 4. Accordingly, information can be recorded or reproduced in a desired position of the optical disk D.

In a case that an optical disk to be recorded or reproduced is changed from the optical disk D into the differently normalized optical disk Da, the carriage 21 having the optical head 2 is brought and withdrawn from the rod-shaped guide rails 31 to the small guide rails 51 by the optical head pushing members 4 and the aforesaid pushing portions, as illustrated in FIG. 2B.

Thereafter, as illustrated in FIG. 2C, the supporting plate 62 is rotated up to an angle of 180 degrees by the rotation driving portion 63. The small guide rails 51a supporting the carriage 21a having the optical head 2a and the magnetic circuit (magnetic members) 64a are substantially coupled to the rod-shaped guide rails 31 and the magnetic circuit (magnetic members) 42, respectively.

The carriage 21a is then sent to the rod-shaped guide rails 31 and the magnetic circuit (magnetic members) 42, as illustrated in FIG. 2D. Consequently, the differently normalized optical disk Da is recorded or reproduced by the optical head 2a.

On the contrary, in a case that an optical disk to be recorded or reproduced is changed from the optical disk Da into the optical disk D, an optical head mounted on the rod-shaped guide rails 31 is changed by similar operations.

According to the optical disk device 10, the optical heads 2, 2a selectively applicable to the differently normalized two kinds of optical disks D, Da are simultaneously contained by the container unit 5, and when necessary, are sent to the rod-shaped guide rails 31 by the optical head moving member 6. As a result, guiding units or members for every optical head are not required. Namely, it is not necessary that a plurality of guide rails for every optical head are provided in the optical disk device 10. Accordingly, it can be prevented that the optical disk device 10 becomes large in size. In other words, a compact optical disk device 10 can be obtained, although the optical disk device 10 is simultaneously applicable to a plurality of differently normalized optical disks.

Further, only one optical head corresponding to a normalization of an optical disk to be recorded or reproduced is set on the rod-shaped guide rails 31. The other optical heads remain in the container unit 5. With the structure, guide rails are commonly used for every optical head. Accordingly, number of parts can be reduced in the first embodiment.

In addition, it is preferable that free ends of both the rod-shaped guide rails 31 and the small guide rails 51, 51a are adjacent or in contact to each other, unless rotation of the small guide rails 51, 51a is disturbed. This is the same for both the magnetic circuit(magnetic members) 42 and the magnetic circuit(magnetic members) 64, 64a.

Referring to FIGS. 3 and 4A through 4D, description will proceed to an optical disk device according to a second embodiment of the present invention.

In FIGS. 3 and 4A through 4D, illustrated is an optical disk device 10A which has a composition basically similar to that of the optical disk device 10 illustrated in FIGS. 1 and 2A through 2D. Similar portions are designated by the same reference numerals.

Figure 3:
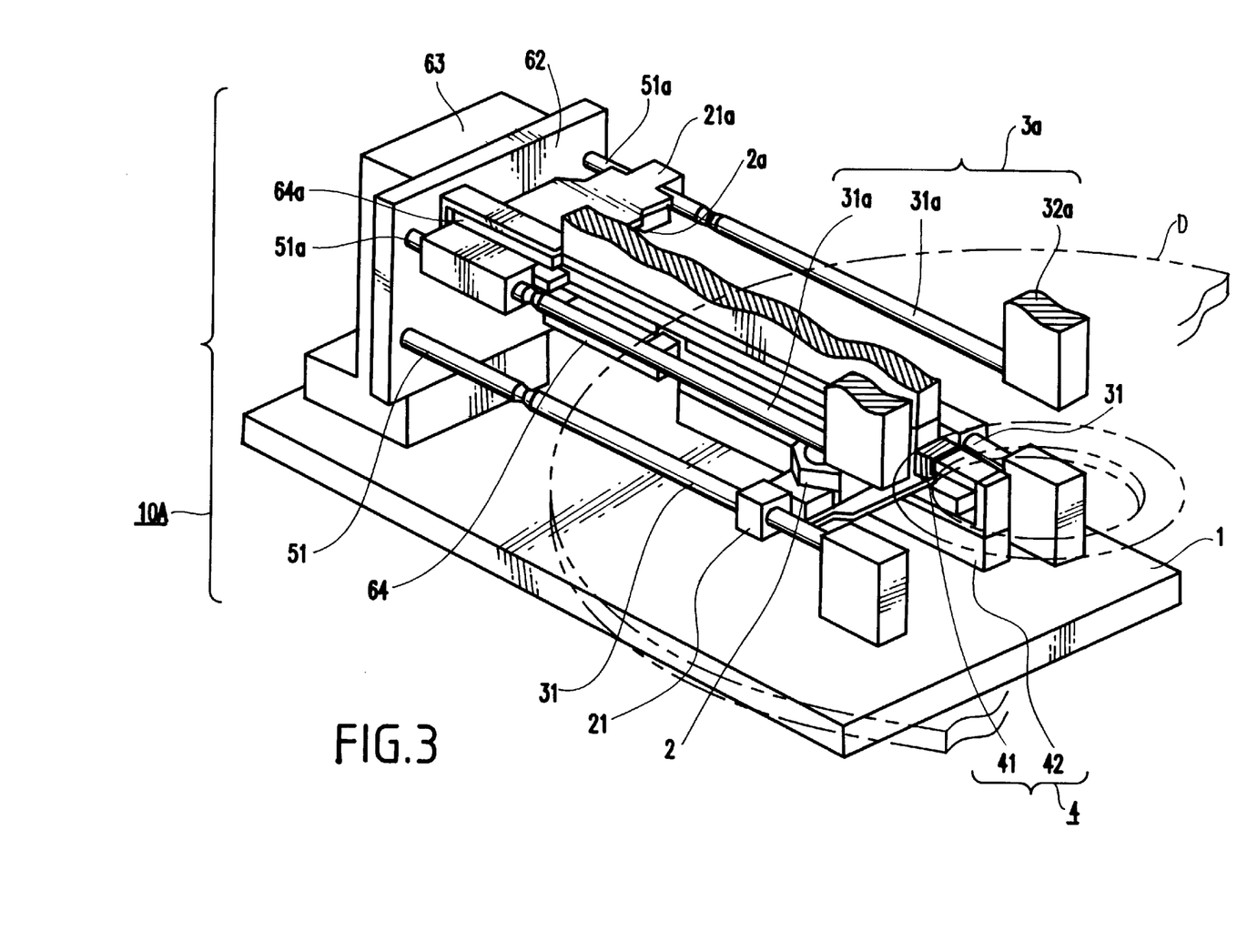
FIG. 3 is a schematic perspective view of an optical disk device according to a second embodiment of the present invention.

As illustrated in FIG. 3, the optical disk device 10A further comprises a guiding member 3a and a magnetic circuit 42a (not shown ) in addition to units or members similar to those of the optical disk device 10.

The guiding member 3a comprises two guide rails 31a and two fixing members 32a for supporting the two guide rails 31a, respectively, as illustrated in FIG. 3. The guide rails 31a are located symmetrically with the rod-shaped guide rails 31 with the above-mentioned rotation axis 65(not shown in FIG. 3) interposed therebetween. The magnetic circuit 42a is also located symmetrically with the magnetic circuit 42 with the above-mentioned rotation axis 65 (not shown in FIG. 3 ) interposed therebetween. Although omitted in FIG. 3, another base stand is provided extendedly in the upper portion of the optical disk device 10A. The fixing members 32a and the magnetic circuit 42a are installed on the another base stand.

When each small guide rail 51 is oppositely connected to each rod-shaped guide rail 31, each small guide rail 51a is also oppositely connected to each guide rail 31a. As a result, optical heads 2, 2a can be sent to the rod-shaped guide rails 31 and guide rails 31a, respectively, through the carriages 21, 21a. On the other hand, when the supporting plate 64 is rotated up to an angle of 180 degrees, the small guide rails 51 are connected to the guide rails 31a while the small guide rails 51a are connected to the rod-shaped guide rails 31. Consequently, the optical heads 2, 2a can in turn be sent to the guide rails 31a and the rod-shaped guide rails 31, respectively, through the carriages 21, 21a.

An optical disk rotation driving member, although omitted in FIG. 3, supports the optical disk D on a surface including the rotation axis 65 with distances from any of the rod-shaped guide rails 31, 31 and the guide rails 31a, 31a being equal to each other. With this structure, even if the optical disk D is a double-faced disk, the optical heads 2, 2a can be sent both to the rod-shaped guide rails 31 and the guide rails 31a by the container unit 5 and the optical head moving member 6. Accordingly, the optical disk D can be recorded or reproduced in the double face thereof.

Referring to FIGS. 4A through 4D with reference to FIG. 3 continued, description is made as regards an operation of the optical disk device 10A.

Figure 4A:
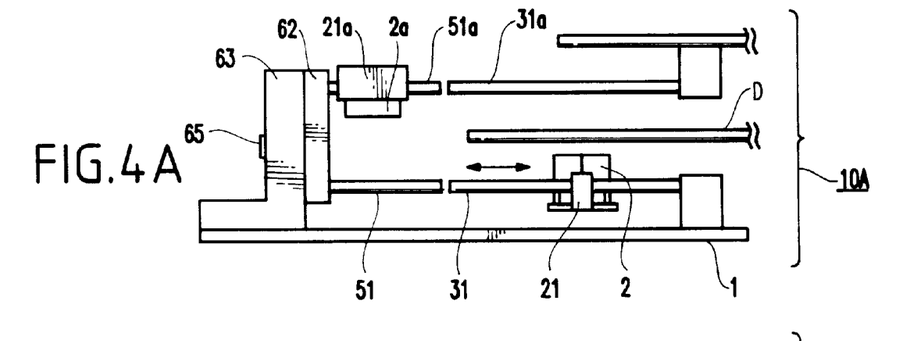
FIGS. 4A through 4D are partial side views of the optical disk device illustrated in FIG. 3, in which an operation thereof proceeds from a step of 2A to that of 2D.

When the lower face of the optical disk D is recorded or reproduced, the carriage 21 having the optical head 2 is brought in a radial direction of the optical disk D through the rod-shaped guide rails 31 positioned in a lower side of the optical disk D, as illustrated in FIG. 4A. Accordingly, an information can be recorded or reproduced in a desired position of the lower face of the optical disk D.

Figure 4B:
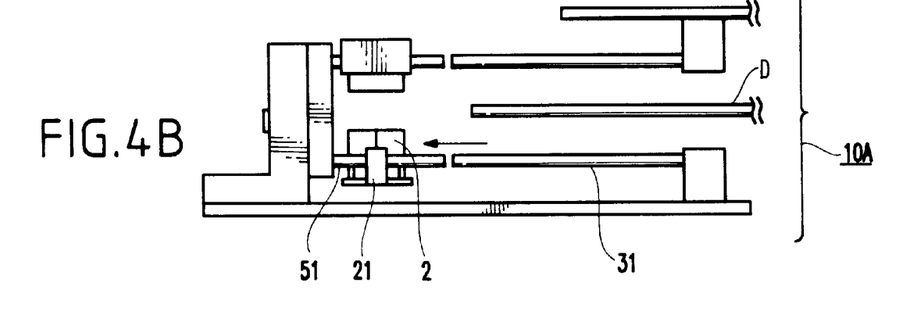

On the contrary, when the upper face of the optical disk D is recorded or reproduced, the carriage 21 having the optical head 2 is brought to the small guide rails 51 and withdrawn, as illustrated in FIG. 4B.

Figure 4C:
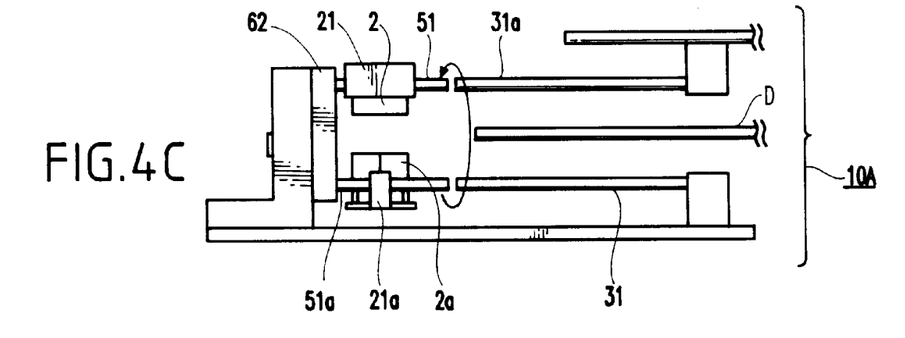

Thereafter, as illustrated in FIG. 4C, the supporting plate 62 is rotated up to an angle of 180 degrees by the rotation driving portion 63. The small guide rails 51 and the magnetic circuit (magnetic members) 64 are substantially coupled to the guide rails 31a and the magnetic circuit 42a (not shown) positioned in an upper side of the optical disk D, respectively.

Figure 4D:
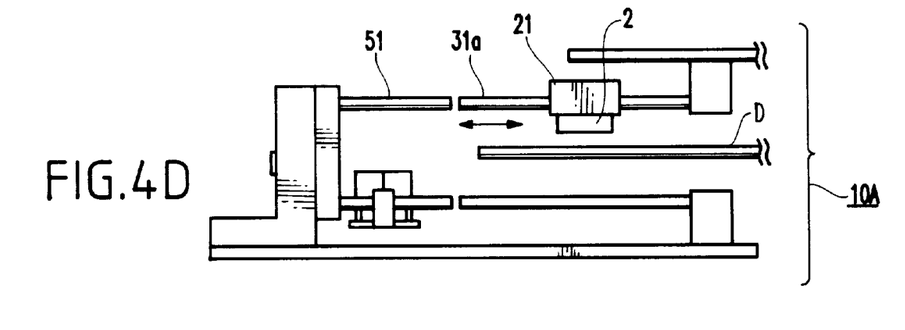

The carriage 21 is then sent to the guide rails 31a and the magnetic circuit 42a, as illustrated in FIG. 4D. Consequently, information can be recorded or reproduced in a desired position of the upper face of the optical disk D.

In a case that an optical disk to be recorded or reproduced is changed from the optical disk D into the differently normalized optical disk Da, in FIG. 4C, the guide rails 51a supporting the carriage 21a and the magnetic circuit 64a are substantially coupled to the guide rails 31 and the magnetic circuit 42 positioned in a lower side of the optical disk D, respectively. The carriage 21a is then sent to the guide rails 81 in the lower side of the optical disk D. Thus, information can be recorded or reproduced in a desired position of the lower face of the optical disk Da.

The operation for changing the optical head is similar to that of the optical disk device 10 mentioned above.

According to the optical disk device 10A, the same advantageous effect as that in the optical disk device 10 can be achieved. A double-faced optical disk can be recorded or reproduced in the double faces thereof without an operation for changing the faces.

Figure 5:
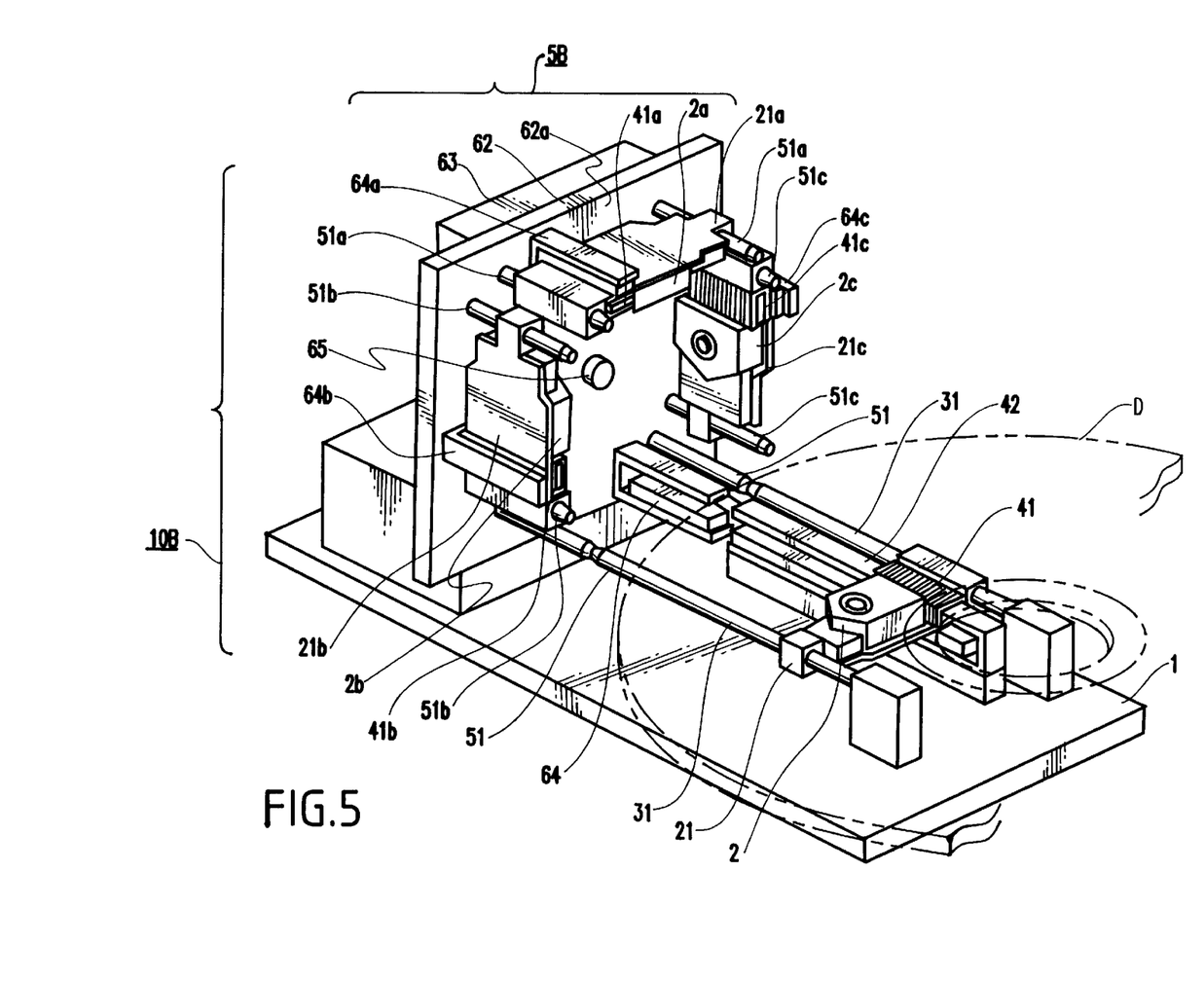
FIG. 5 is a schematic perspective view of an optical disk device according to a third embodiment of the present invention.

Referring to FIG. 5, description will proceed to an optical disk device according to a third embodiment of the present invention.

In FIG. 5, illustrated is an optical disk device 10B which has a composition basically similar to that of the optical disk device 10 illustrated in FIGS. 1 and 2A through 2D. Similar portions are designated by the same reference numerals.

As illustrated in FIG. 5, the optical disk device 10B is characterized in that four optical heads are mounted. Except for compositions added by mounting the four optical heads, the optical disk device 10B has the same composition as that of the optical disk device 10. As illustrated in FIG. 5, two couples of small guide rails 51, 51b, 51a, 51c are installed on the flat surface 62a of the supporting plate 62 at angles of every 90 degrees around the rotation axis 65 in parallel thereto with distances therefrom being equal to each other. Carriages 21b, 21c having a structure similar to that of the carriage 21 are supported on one couple of the small guide rails 51b, 51c. Coils 41b, 41c having a structure similar to that of the coil 41 are mounted on the carriages 21b, 21c. Also optical heads 2b, 2c which are differently normalized from the optical heads 2, 2a (applicable to an optical disk differently normalized from the optical disks 10, 10A) are mounted on the carriages 21b, 21c. Corresponding to the coils 41b, 41c on the carriages 21b, 21c, magnetic circuits 64b, 64c are installed in parallel to the small guide rails 51b, 51c near the small guide rails 51b, 51c on the flat surface 62a.

According to the optical disk device 10B, the supporting plate 62 is rotated by every angle of 90 degrees by the rotation driving portion 63. Thereby, the small guide rails and the magnetic circuit connected to the guide rails 31 and the magnetic circuit 42 are changed into another small guide rails and the magnetic circuit. A carriage having an optical head applicable to a desired optical disk can be sent to the guide rails 31. Accordingly, differently normalized four kinds of optical disks can be recorded or reproduced by the optical disk device 10B.

Figure 6:
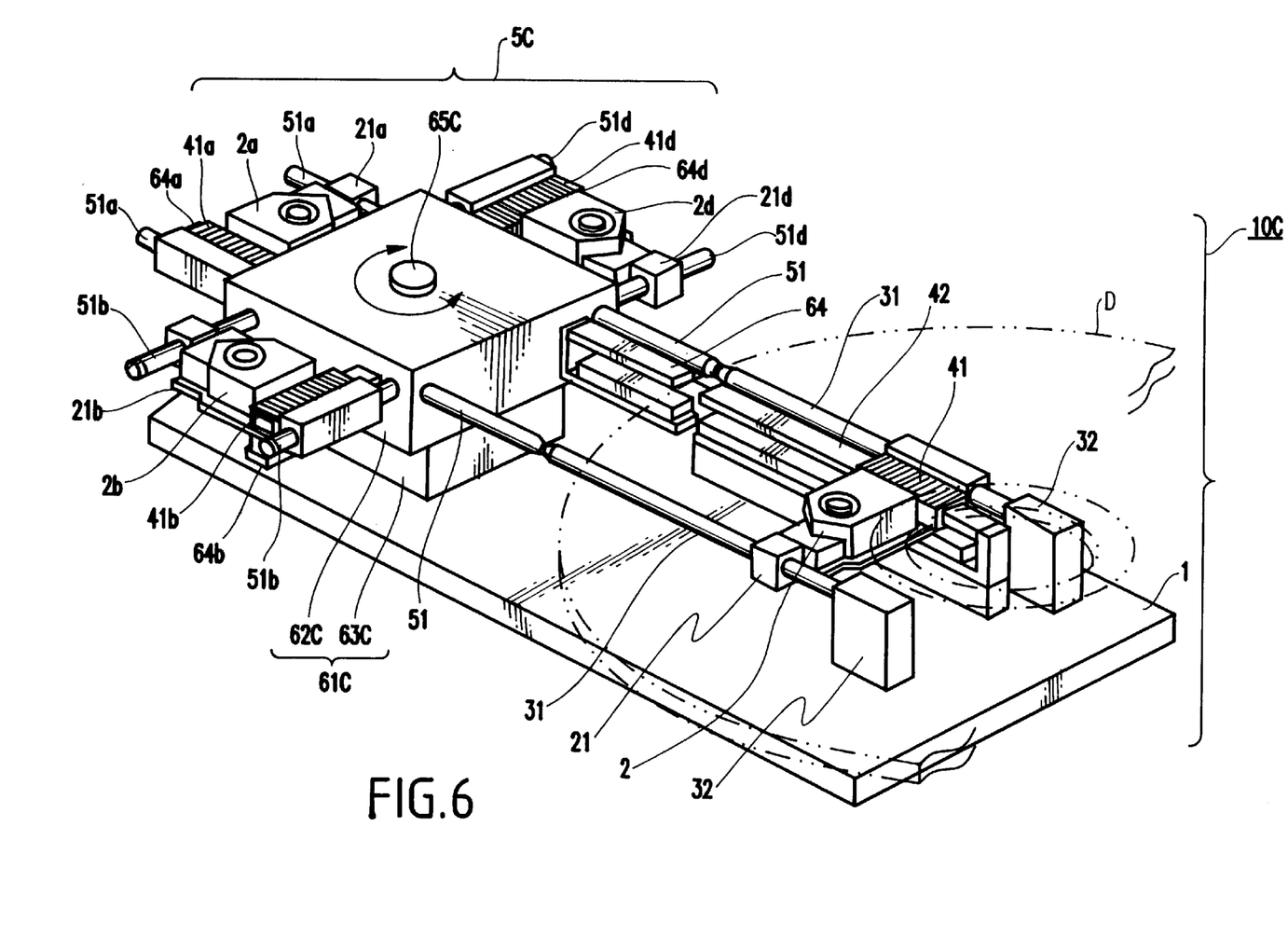
FIG. 6 is a schematic perspective view of an optical disk device according to a fourth embodiment of the present invention.

Referring to FIG. 6, description will proceed to an optical disk device according to a fourth embodiment of the present invention.

In FIG. 6, illustrated is an optical disk device 10C which has a composition basically similar to that of the optical disk device 10B illustrated in FIG. 5. Similar portions are designated by the same reference numerals.

As illustrated in FIG. 6, in the optical disk device 10C, the connecting portion 61C comprises a supporting member 62C and a rotation driving portion 63C. The supporting member 62C is rotatable around a rotation axis 65C which is directed perpendicular to the recording surface of the optical disk D. Rotation of the supporting member 62C is driven by the rotation driving portion 63C.

In each surface of four surfaces of the supporting member 62C which are perpendicular to the rotation axis 65C, a couple of small guide rails 51, 51b, 51a, or 51c are installed perpendicular to each surface of the four surfaces within the same imaginary plane in parallel to the base stand 1. The guide rails 31 are also located within the same imaginary plane. Near each of the small guide rails 51, 51b, 51a, or 51c, magnetic circuits 64, 64b, 64a, or 64c are installed in the same direction as that of the small guide rails 51, 51b, 51a, or 51c. Every distance from the rotation axis 65C to the free ends of the small guide rails 51, 51b, 51a, or 51c are equal in length or a little shorter than distances from the rotation axis 65C to the free ends of the guide rails 31. When the supporting member 62C is rotated by every angle of 90 degrees, the free ends of the small guide rails 51, 51b, 51a, or 51c and the free ends of the guide rails 31 become adjacently opposite to each other. At the same time, the magnetic circuits 64, 64b, 64a, or 64c and the magnetic circuit 42 become adjacently opposite to each other, when the supporting member 62C is rotated by every angle of 90 degrees. Thus, it becomes possible that each carriage 21, 21b, 21a, or 21c move between the small guide rails 51, 51b, 51a, or 51c and the guide rails 31.

According to the optical disk device 10C, the supporting member 62C is rotated by every angle of 90 degrees within an imaginary plane parallel to the guide rails 31. A carriage having an optical head applicable to a desired optical disk can be sent to the guide rails 31. Accordingly, differently normalized four kinds of optical disks can be recorded or reproduced by the optical disk device 10C.

In the fourth embodiment, compared with the optical disk device 10B of the aforesaid third embodiment, the optical disk device 10C can be fabricated to be smaller in height. This is because all of the small guide rails 51, 51b, 51a, and 51c are located within an imaginary plane which is parallel to the optical disk D.

Figure 7:
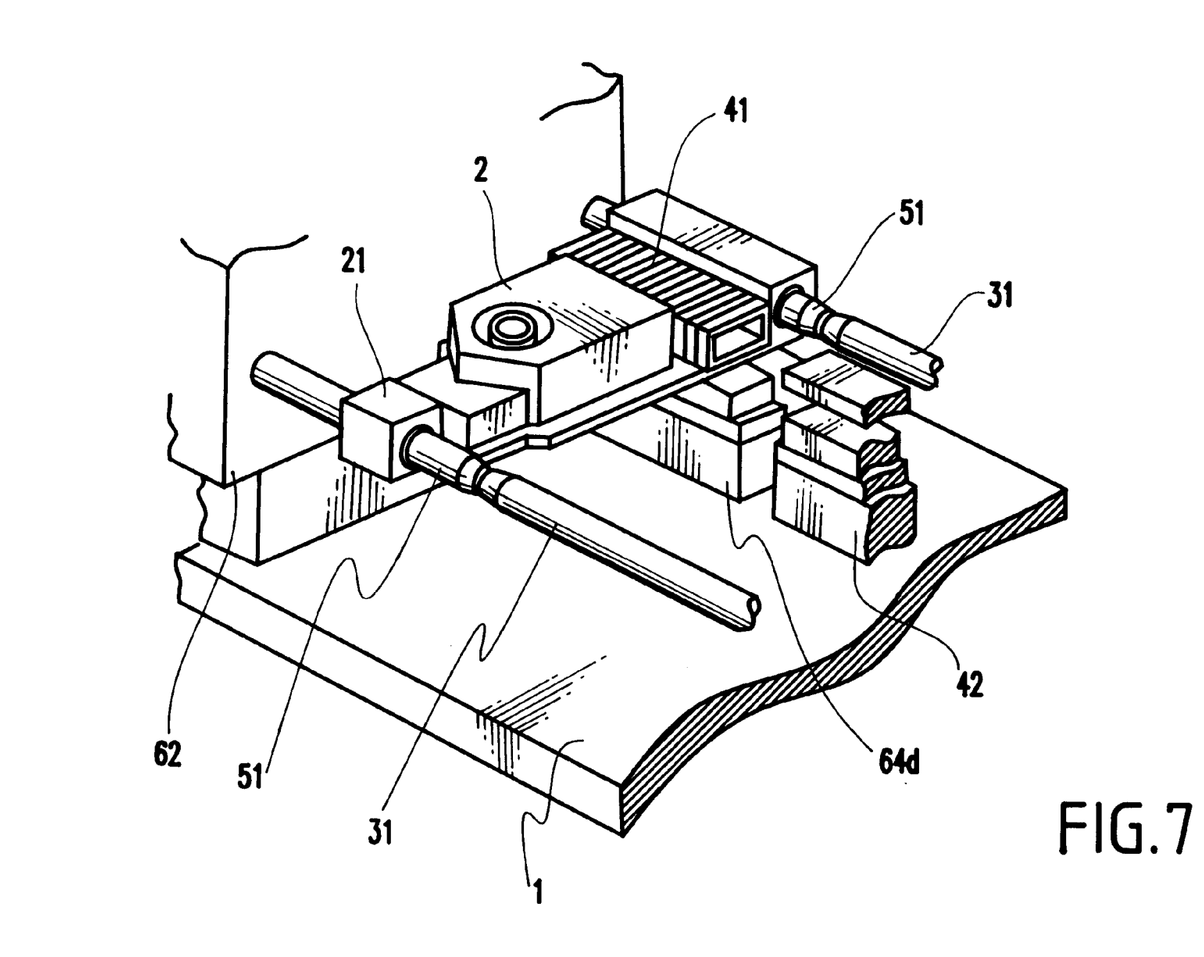
FIG. 7 is a schematic perspective view for showing a magnetic circuit of an optical head moving unit in an optical disk device according to a fifth embodiment of the present invention.

Herein, referring to FIG. 7, description is made about an optical disk device according to a fifth embodiment of the present invention.

In FIG. 7, illustrated is another example of a magnetic circuit serves for the moving operation driving portion in the fifth embodiment. In the above-mentioned first through fourth embodiments, magnetic circuits 64, 64a, 64b, 64c independently constructing the moving operation driving portion are provided on the supporting plate 62 or the supporting member 62C in correspondence with each of the optical heads 2, 2a, 2b, 2c. However, only one magnetic circuit 64d may be provided on the base stand 1 in an extended direction of the magnetic circuit 42. The one magnetic circuit 64d is provided adjacent to the coil 41 mounted on the carriage 21 without disturbing a rotation of the small guide rails 51, 51b, 51a and 51c. According to this embodiment, not only weight of the optical disk device but also numbers of units or members thereof can be reduced.

According to the present invention, a plurality of optical heads selectively applicable to each of a plurality of differently normalized optical disks are all contained in a container unit. The optical heads are sent to a guiding member by optical head moving member, when necessary. It becomes unnecessary that a guiding member is provided for every optical head. The optical disk device does not become large in size, The optical disk device can be compact in size, although it is applicable to a plurality of differently normalized optical disks.

Only the optical head corresponding to the normalization of an optical disk to be recorded or reproduced is set on the guide rails. The other optical heads remain in the container unit. A single guide rail can be commonly used for every optical head. Numbers of units or members can therefore be reduced in the optical disk device.

Moreover, when all of the small guide rails are located within an imaginary plane which is parallel to the optical disk, the optical disk device can be fabricated to be small in height.

While the present invention has thus far been described in conjunction with only several embodiments thereof, it will now be readily possible for those skilled in the art to put this invention into practice in various other manners. For example, in the above-mentioned first through fifth embodiments, magnetic circuits are used for making the carriages on each small guide rail move toward a guide rail coupled to the small guide rail. However, the other mechanism using a spring or the like may be used as such a carriage driving member or unit,

What is claimed is:

1. An optical disk device for recording and reproducing an optical disk and which is capable of being applied to a plurality of optical disks differently normalized from each other, comprising:

rotation driving means for supporting said optical disk and for driving rotation of said optical disk;

a plurality of optical heads which are applicable to said plurality of differently normalized optical disks, respectively;

single guiding means, commonly provided for all of said plurality of optical heads, for selectively guiding said plurality of optical heads individually in a radial direction of said optical disk supported by said rotation driving means;

pushing means for pushing each of said plurality of optical heads along said single guiding means;

container means for containing all of said plurality of optical heads; and optical head moving means for moving one of said plurality of optical heads from said container means toward said single guiding means or from said single guiding means toward said container means.

2. An optical disk device as claimed in claim 1, wherein said container means comprises a plurality of containers for said plurality of optical heads, respectively, said optical head moving means comprising a connecting portion for selectively connecting said container means with said single guiding means, and a pushing portion for pushing said one of said plurality of optical heads between each of said containers and said single guiding means.

3. An optical disk device, for recording and reproducing an optical disk and which is capable of being applied to a plurality of optical disks differently normalized from each other, comprising:

rotation driving means for supporting said optical disk and for driving rotation of said optical disk;

a plurality of optical heads which are applicable to said plurality of differently normalized optical disks, respectively;

single guiding means for guiding each of said plurality of optical heads in a radial direction of said optical disk supported by said rotation driving means;

pushing means for pushing said each of said plurality of optical heads along said single guiding means;

container means for containing all of said plurality of optical heads; and optical head moving means for moving one of said plurality of optical heads from said container means toward said single guiding means or from said single guiding means toward said container means, wherein said container means comprises a plurality of containers for said plurality of optical heads, respectively, said optical head moving means comprising a connecting portion for selectively connecting said container means with said single guiding means, a pushing portion for pushing said one of said plurality of optical heads between each of said containers and said single guiding means, and a predetermined rotation axis, wherein each of said containers is located at a distance equal to each other from said rotation axis, said connecting portion rotating said container means around said rotation axis so as to connect said container means with said single guiding means.

4. An optical disk device as claimed in claim 3, wherein said single guiding means comprises a first straight guide rail located in a radial direction of said optical disk, said plurality of containers comprising a plurality of second straight guide rails each having a length which is at least greater than a width of a moving direction of said optical head, respectively, said plurality of second straight guide rails being located in parallel to said first straight guide rail, respectively, said connecting portion rotating each of said second straight guide rails around said rotation axis including a part of each of said second straight guide rails in the direction parallel to said first straight guide rail so as to position each of said second straight guide rails on the same line as that of said first straight guide rail.

5. An optical disk device as claimed in claim 4, wherein said plurality of second straight guide rails comprise rods, respectively having the same cross-sectional shape as each other, said rods being fixed by one end, a second free end of each of said rods being opposite to each other, said connecting portion supporting said second straight guide rails on the same surface simultaneously, said connecting portion being rotatable around said rotation axis, a first distance from said rotation axis to said first straight guide rail and a second distance from said rotation axis to each of said second straight guide rails being equal to each other, a third distance from said surface to said free end of said first straight guide rail being substantially equal to a length of each of said second straight guide rails.

6. An optical disk device as claimed in claim 3, wherein said single guiding means comprises a first straight guide rail located in a radial direction of said optical disk, said plurality of containers comprising a plurality of second straight guide rails each having a length which is at least greater than a width of a moving direction of said optical head, respectively, said plurality of second straight guide rails being located radially around a direction perpendicular to an elongated line of said first straight guide rail, said connecting portion rotating each of said second straight guide rails around said rotation axis including said radially formed central portion so as to position each of said second straight guide rails on the same line as that of said first straight guide rail.

7. An optical disk device as claimed in claim 6, wherein said plurality of second straight guide rails comprise rods, respectively having the same cross-sectional shape as each other, both of said rods being fixed by one end, said connecting portion supporting said second straight guide rails on the same surface including said first straight guide rail simultaneously, said connecting portion being rotatable around said rotation axis, a primary distance from said rotation axis to a free end of said first straight guide rail and a secondary distance from said rotation axis to a free end of each of said second straight guide rails being equal to each other.

8. The optical disk device as claimed in claim 2, wherein said container means further comprises a predetermined rotation axis, wherein each of said containers is located at a distance equal to each other from said rotation axis.

9. The optical disk device as claimed in claim 8, wherein said connecting portion rotates said container means around said rotation axis so as to connect said container means with said single guiding means.

10. The optical disk device as claimed in claim 8, wherein said single guiding means comprises a first straight guide rail located in a radial direction of said optical disk.

11. The optical disk device as claimed in claim 10, wherein said plurality of containers comprise a plurality of second straight guide rails each having a length which is at least greater than a width of a moving direction of said optical head, respectively.

12. An optical disk device for recording and reproducing an optical disk and which is capable of being applied to a plurality of optical disks differently normalized from each other, comprising:

a rotation driving unit for supporting said optical disk and for providing a drive rotation of said optical disk;

a plurality of optical heads which are applicable to said plurality of differently normalized optical disks, respectively;

a single guiding member, commonly provided for all of said plurality of optical heads, for selectively guiding said plurality of optical heads individually in a radial direction of said optical disk supported by said rotation driving unit; and an optical head moving member for moving one of said plurality of optical heads toward or from said single guiding member.

13. An optical disk device for recording and reproducing an optical disk and which is capable of being applied to a plurality of optical disks differently normalized from each other, comprising:

a rotation driving unit for supporting said optical disk and for providing a drive rotation of said optical disk;

a plurality of optical heads which are applicable to said plurality of differently normalized optical disks respectively;

a single guiding member, commonly provided for all of said plurality of optical heads, for selectively guiding said plurality of optical heads individually in a radial direction of said optical disk supported by said rotation driving unit; and a pushing member for pushing each of said plurality of optical heads toward or from said single guiding member.

14. The optical disk device, as claimed in claim 12, further comprising:

a container unit for containing all of said plurality of optical heads, said optical head moving member for moving one of said plurality of optical heads from said container unit toward said single guiding member or from said single guiding member toward said container unit.

15. An optical disk device as claimed in claim 14, wherein said container unit comprises a plurality of containers for said plurality of optical heads, respectively, said optical head moving member comprising a connecting portion for selectively connecting said container with said single guiding member, and a pushing portion for pushing said one of said plurality of optical heads between each of said containers and said single guiding member.

16. The optical disk device as claimed in claim 15, wherein said container unit further comprises a predetermined rotation axis, wherein each of said containers are located at a distance equal to each other from said rotation axis, said connecting portion rotating said container around said rotation axis so as to connect said container with said single guiding member.

17. An optical disk device as claimed in claim 16, wherein said single guiding member comprises first straight guide rail and a plurality of second straight guide rails comprise rods, respectively having the same cross-sectional shape as each other, said rods being fixed at one end, free ends of said rods being opposite to each other, said connecting portion supporting said second straight guide rails on the same surface simultaneously, said connecting portion being rotatable around said rotation axis, a first distance from said rotation axis to said first straight guide rail and a second distance from said rotation axis to each of said second straight guide rails being equal to each other, a third distance from said surface to said free end of said first straight guide rail being substantially equal to a length of each of said second straight guide rails.

18. An optical disk device as claimed in claim 16, wherein said single guiding member comprises a first straight guide rail located in a radial direction of said optical disk, said plurality of containers comprising a plurality of second straight guide rails each having a length which is at least greater than a width of a moving direction of said optical head, respectively, said plurality of second straight guide rails being located radially around a direction perpendicular to an elongated line of said first straight guide rail, said connecting portion rotating each of said second straight guide rails around said rotation axis including said radially formed central portion so as to position each of said second straight guide rails on the same line as that of said first straight guide rail.

19. An optical disk device as claimed in claim 12, wherein said single guiding member comprises a first straight guide rail located in a radial direction of said optical disk.

* * * * *